(12) United States Patent
Ianos

(10) Patent No.: US 7,924,791 B2
(45) Date of Patent: Apr. 12, 2011

(54) METHOD OF TRANSMITTING DATA PACKETS BETWEEN TWO SLAVE UNITS AND A MASTER UNIT COMPRISING TWO PROCESSORS

(75) Inventor: Anca-Marina Ianos, Grenoble (FR)

(73) Assignee: STMicroelectronics S.A., Montrouge (FR)

(*) Notice: Subject to any disclaimer, the term of this patent is extended or adjusted under 35 U.S.C. 154(b) by 1404 days.

(21) Appl. No.: 11/019,436

(22) Filed: Dec. 21, 2004

(65) Prior Publication Data
US 2005/0163087 A1 Jul. 28, 2005

Related U.S. Application Data

(63) Continuation of application No. PCT/FR2003/001934, filed on Jun. 24, 2003.

(30) Foreign Application Priority Data

Jun. 27, 2002 (FR) .................................. 02 08004

(51) Int. Cl.
*H04Q 7/24* (2006.01)
(52) U.S. Cl. ....................................... 370/338
(58) Field of Classification Search ............ 455/41, 455/444, 445; 370/338, 392, 400, 401, 237, 370/238, 229–236, 345, 346
See application file for complete search history.

(56) References Cited

U.S. PATENT DOCUMENTS

| | | | | |
|---|---|---|---|---|
| 2001/0002908 A1* | 6/2001 | Rune et al. | ..................... | 370/392 |
| 2002/0089963 A1* | 7/2002 | Kang et al. | ..................... | 370/340 |
| 2003/0012219 A1* | 1/2003 | Joo | ................. | 370/449 |
| 2003/0035382 A1* | 2/2003 | Jose | ................. | 370/280 |
| 2003/0152110 A1* | 8/2003 | Rune | ................. | 370/509 |
| 2003/0235202 A1* | 12/2003 | Van Der Zee et al. | ........ | 370/428 |
| 2006/0013164 A1* | 1/2006 | Paryani | ..................... | 370/329 |
| 2006/0101164 A1* | 5/2006 | Lee et al. | ................. | 710/19 |
| 2006/0146777 A1* | 7/2006 | Ami et al. | ..................... | 370/338 |

FOREIGN PATENT DOCUMENTS

| EP | 1 107 521 | 6/2001 |
|---|---|---|
| WO | WO 01/69869 | 9/2001 |

OTHER PUBLICATIONS

Specification vol. 1, Specificaton of the Bluetooth System, Core, Part D, "Logical Link Control and Adaptation Protocol Specification", Version 1.1, Feb. 22, 2001, pp. 1, 254-330, XP002235462.

Specification vol. 1, Specification of the Bluetooth System, Core, Part H:1, "Host Controller Interface Functional Specification", Version 1.1, Feb. 22, 2001, pp. 1, 536-780, XP002235463.

International Search Report, PCT/FR03/01934, dated Nov. 14, 2003.

* cited by examiner

*Primary Examiner* — George Eng
*Assistant Examiner* — Khawar Iqbal
(74) *Attorney, Agent, or Firm* — Gardere Wynne Sewell LLP

(57) ABSTRACT

A method of transmitting data packets within a local network including a master unit and at least two slave units is adapted to a configuration according to which the master unit comprises two processors. The first processor executes an application and the second processor controls a transmission of data between the master unit and any one of the slave units. According to the method, data packets sent by a first slave unit to a second slave unit pass through the second processor and are forwarded directly in accordance with a readdressing directive obtained from addressing elements which are interassociated and communicated by the first processor to the second processor.

8 Claims, 4 Drawing Sheets

METHOD OF TRANSMITTING DATA PACKETS BETWEEN TWO SLAVE UNITS AND A MASTER UNIT COMPRISING TWO PROCESSORS

PRIORITY CLAIM

The present application is a filing claiming the benefit, under 35 U.S.C. 363 and 365(c), of PCT/FR03/01934 filed Jun. 24, 2003, which claims priority from French Application for Patent No. 02 08004 filed Jun. 27, 2002, the disclosures of which are hereby incorporated by reference.

BACKGROUND OF THE INVENTION

1. Technical Field of the Invention

The present invention relates to a method of transmitting data packets by radio within a local network comprising at least two slave communication units and a master communication unit through which all the data packets transmitted within the network travel. The present invention relates more particularly to such a method adapted to a configuration of the master unit according to which the latter comprises two processors interlinked by an internal interface.

2. Description of Related Art

It is known to use a star structure for the transmission of data within a network comprising at least three communication units. Such a structure is particularly adapted for networks comprising a reduced number of units communicating with one another. In such a network structure, one of the units plays a role of coordinator to which the other units are subservient. All the data intended to be transmitted between any two units of such a network are firstly received by the master unit which thereafter re-sends to one of the slave units the data initially intended for the master.

It is moreover often advantageous to distribute, within a communication unit, the functions executed by this unit between two processors interlinked by a connection internal to the unit.

The first processor can be especially adapted for the execution of a particular application. For this purpose, it can comprise means which are specifically appropriate for the execution of the program of this application, such as specified memory elements or a specified controller of interfaces for entering inputs and/or presenting data intended for a user of the unit.

The second processor executes so-called low level operations required for the transmission of data between this communication unit and an outside unit belonging to the network. In particular, it configures the data in a form adapted for their transmission, such as, in particular, a distributing of the data into packets adapted to the type of transmission used between the various communication units. It furthermore commands a sender/receiver of signals exchanged with the outside communication units.

Such a model of second processor operation may be common to all the communication units operating according to one and the same mode of transmission. This results in a reduction in the cost of the second processor, through a scale effect in the manufacture thereof. On the other hand, this second processor may be associated in one and the same unit with a first processor of variable model depending on the main application intended to be executed in this unit. A specialization of each communication unit is thus possible, while also benefitting from the cost reduction related to the second processor.

In what follows, we consider a distribution of the functions between the two processors of a communication unit according to which the application executed by the first processor manages the transmission of the data relating to this application within the network as a whole. In particular, the transmission of data between two slave units is controlled by the application itself, which fulfils a pivot function for retransmission of data intended for a slave unit, as a function of the recipient unit identified for these data. Such a role is commonly devolved to the application program residing in the master unit, because it alone is capable of interpreting all the data which pertain to the application and, consequently, of determining whether a processing needs to be applied to these data or whether the latter need to be retransmitted without modifications to one of the slave units.

All the data exchanged between any two units of the network are therefore transmitted to the first processor of the master unit via the connection, internal to this unit, between the two processors. As a result, the more considerable the amount of data exchanged within the network, the more appreciable is the energy consumption related to this internal transmission. In the case where the master unit possesses an autonomous power supply, of the cells or batteries type, its autonomy is then reduced on account of the internal transmission of a sizeable amount of data.

Another drawback of the transmission of a sizeable amount of data between the two processors of the master unit resides in the need to equip the internal connection for transmission between the two processors with a sufficient buffer memory. Apart from the cost of this buffer memory, the latter also gives rise to additional energy consumption.

There is accordingly a need to alleviate the aforesaid drawbacks.

SUMMARY OF THE INVENTION

The present invention relates to a local network comprising at least three communication units, one of these units having a role of master unit and the other units having a role of slave units co-ordinated by the master unit. The master unit comprises a first and a second processor interlinked by a connection internal to the master unit. The first processor executes an application and the second processor executes operations of data transmission between the master unit and any one of the slave units.

According to the invention, a method of transmitting data packets comprises the following steps for the transmission of data produced by a first slave unit to a second slave unit:

a—sending of first data packets by the first slave unit;
b—reception of the first data packets by the master unit;
c—analysis by the second processor of addressing elements associated with the first data packets so as to determine whether certain addressing elements meet a condition specified in a readdressing directive; and
d—if the condition is met, sending by the master unit to the second slave unit of second data packets corresponding to the first data packets.

Apart from the aforesaid reduction in the energy consumption of the master unit, an advantage of the method of the invention resides in a reduction in the duration of transmission between two slave units. Specifically, such data no longer pass through the first processor of the master unit, thereby consequently eliminating the waiting periods related to the transmission between the two processors of the master unit. Among the waiting periods eliminated feature those of the steps of shaping the data for transmission between the two processors, of waiting for the data in a buffer memory before this transmission, as well as of processing of the data by the application within the first processor.

In the preferred mode of implementation of the invention, if certain of the addressing elements analyzed do not meet the specified condition, the second processor transmits, during step d, a part at least of the data corresponding to the first packets with which these addressing elements are associated to the first processor through the connection internal to the master unit. Thus, the method of the invention does not impede access to the application program of the master unit, in respect of data which are intended for this program originating from any one of the slave units. The second processor consequently possesses a function for routing the data corresponding to all the first packets received by the master unit, either to a slave unit in the form of second re-sent packets, or to the first processor via the connection internal to the master unit.

The application executed in the first processor of the master unit, as a program catering for the control of the data exchanged between the various units, interassociates addressing elements, from which the readdressing directive is produced. These interassociated addressing elements are transmitted to the second processor through the connection internal to the master unit. They can be obtained by a specific interrogation of the slave units by the master unit. They can also be read by the second processor from signaling packets exchanged when connections are set up between slave units and the master unit.

This readdressing directive possesses two functions. On the one hand it specifies selection criteria implemented by the second processor for sorting out from among all the data packets received by the master unit from the slave units those which are intended for another slave unit, without intermediate processing by the application program residing in the master unit. This selection is made on the basis of the condition specified in the readdressing directive and bearing on certain of the addressing elements associated with the packets. These addressing elements may be determined by the second processor in accordance with particular transmission parameters such as, for example, a logical channel reference. They may also be read from certain at least of the data packets received by the master unit from the slave units, either at the level of a header of these packets, or in the data transported by these packets. In the latter case, the readdressing directive contains an indication of the location of the relevant addressing elements within the data packets. The addressing element or elements read from the data packets received may be, in particular, an indicator of the recipient communication unit for the data contained in these packets received.

According to certain modes of communication, data of one and the same communication session between two units are contained in a series of data packets sent successively by a first data producing unit, and a part at least of the addressing elements associated with all the packets of the series is carried by the first packet of said series. In this case, the second processor determines in accordance with the first packet, as a function of the directive and of the readdressing condition, the processing to be applied individually to the set of data packets of the series.

The second function of the readdressing directive comprises specifying the mode of construction of the second data packets sent during step d corresponding to first data packets whose addressing elements meet the readdressing condition. The second data packets may, for example, be obtained directly by the second processor from the first data packets to which they correspond individually by replacing, for certain at least of the first packets, initial addressing elements by addressing elements corresponding to the recipient slave unit for the data.

The invention also relates to a system for transmitting data packets which is adapted for the implementation of a method of transmission as described previously.

The invention further relates to a control processor for controlling a transmission of data by radio in the form of data packets comprising an interface making it possible to connect said control processor to a host processor of a data processing, and furthermore comprising:

means for receiving by the connection interface of signals corresponding to interassociated addressing elements;

means for forming a readdressing directive from the interassociated addressing elements, the readdressing directive comprising a readdressing condition;

means for recording the readdressing directive;

means for analyzing data packets received as a function of the readdressing condition;

means for replacing initial addressing elements of certain at least of the data packets received meeting the readdressing condition by new addressing elements determined in accordance with the readdressing directive; and means for commanding a sending of data packets corresponding to the data packets received meeting the readdressing condition.

The replaced addressing elements may comprise, in particular, a connection handle and/or a logical channel reference.

Optionally, the control processor may furthermore comprise means for reading from certain at least of the packets received a logical channel reference and/or an indicator of the recipient communication unit for the data contained in the packets received.

It may further comprise means for transmitting by the connection interface of data corresponding to packets received not satisfying the readdressing condition.

The invention furthermore relates to a radio communication unit comprising such a control processor.

It finally relates to a host processor for at least one application comprising means for executing the application, means for managing communications within a local network as a master unit, and means for interassociating data packet addressing elements, this host processor furthermore comprising an interface for connecting a control processor for a transmission of data packets within the local network, and means for transmitting through the connection interface of signals corresponding to the interassociated addressing elements or signals carrying data processed by the application.

BRIEF DESCRIPTION OF THE DRAWINGS

Other features and advantages of the present invention will become apparent in the following description of a nonlimiting exemplary implementation, with reference to the appended drawings, in which.

DETAILED DESCRIPTION OF THE DRAWINGS

The invention is now described in detail in respect of a transmission network in accordance with the BLUETOOTH™ standard, well known to the person skilled in the art.

The Bluetooth standard relates in particular to the transmission of data between several communication units forming a local network, a so-called "piconet." This network, in the mode of operation considered in what follows, comprises a master unit such as introduced previously, and at most seven slave units co-ordinated by the master unit. According to a feature of the "piconets" which is specified by the Bluetooth standard, all the communication units of a "piconet" are interchangeable as regards the roles of master or slave unit. For this purpose, each communication unit incorporates means for co-ordinating communications within the "piconet" and means for operating in a manner co-ordinated by an outside master unit, these means being activated alternately as a function of the communication unit having the role of master unit.

Figure 1:
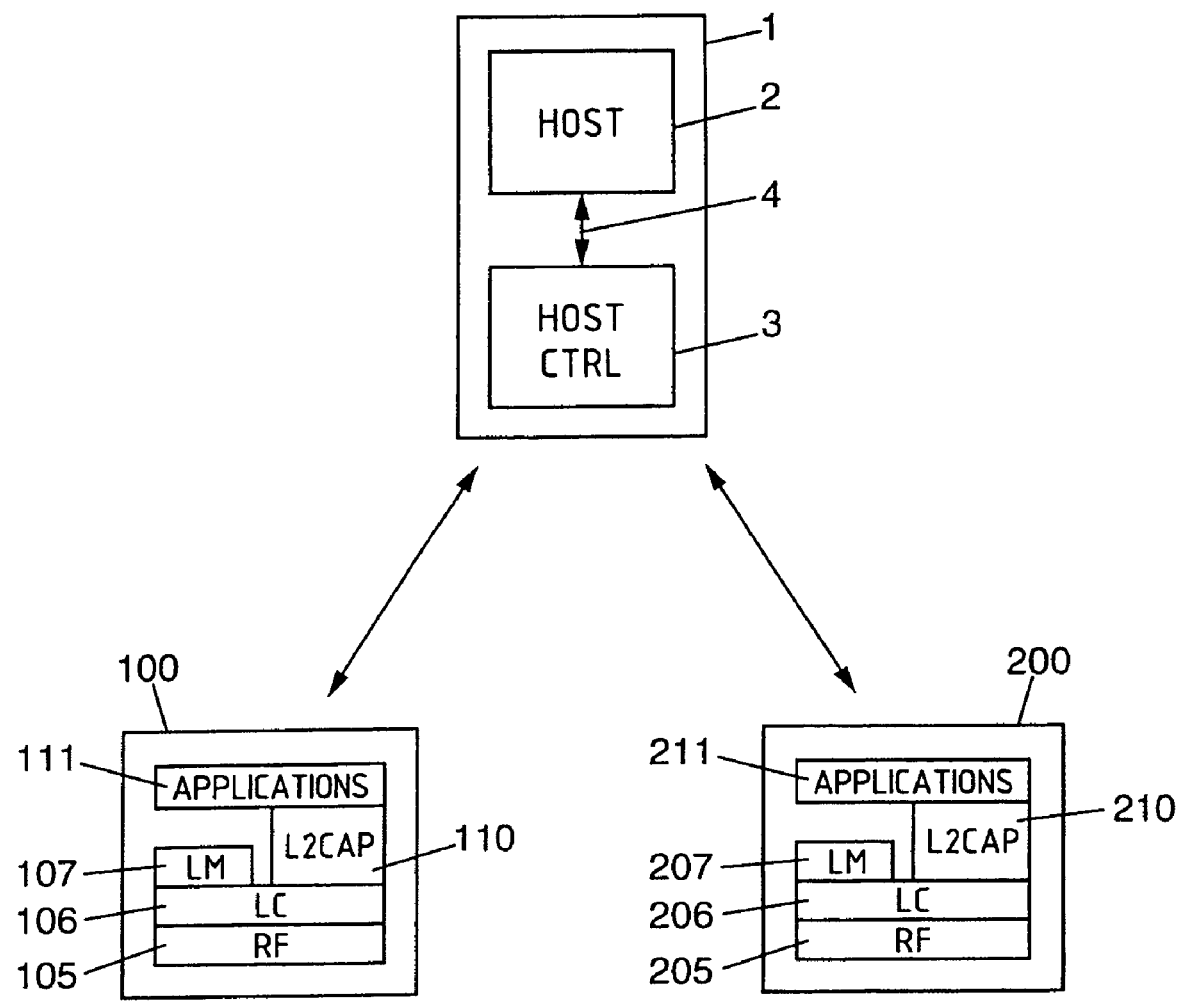
FIG. 1 represents a local network to which the invention is applied.

FIG. 1 represents three units of one and the same "piconet," among which the unit 1 fulfils the function of master. This role is allocated to the unit 1 in everything that follows. The units 100 and 200 are slaves. Each unit 1, 100, 200 may be of varied type, such as, for example, a computer unit, a games console, a keyboard, a display screen, a printer, a home-automation facility, a communication terminal, and the like. It contains at least one application package, or application program, allowing in particular this unit to fulfill its main function, namely data processing in respect of a computer unit or a games console, data entry in respect of a keyboard, data display in respect of a screen, printing in respect of a printer, and the like.

In a customary manner in the field of communications, each unit is designed in accordance with a stack of protocols allowing it to exchange data in a manner compatible with the other units of the "piconet." Among these protocols may feature, for example:

- an RF send and receive command protocol, corresponding to the layers 105 and 205 respectively for the units 100 and 200;
- a protocol for executing so-called low level transmission operations (or "baseband"), such as the "Link Controller" (or LC) protocol known to the person skilled in the art, and corresponding to the layers 106 and 206 for the units 100 and 200;
- a protocol for initializing and managing communications between the units of the "piconet" corresponding to the layers 107 and 207, such as, for example, the "Link Manager" (or LM) protocol also known to the person skilled in the art;
- a protocol for multiplexing the signals intended, in particular, for different applications. This may be the "Logical Link Control and Adaptation Protocol" (or L2CAP) protocol, again known to the person skilled in the art. The layers 110 and 210 of the L2CAP protocol cater moreover, in particular, for the shaping of packets of data intended to be transmitted, or, conversely, the grouping of data received into successive packets; and
- at least one application program 111, 211 residing in each unit. These application programs are the final recipients of the data exchanged within the "piconet." Several units exchanging data relating to a specified application must each contain a program of this application so as to produce, interpret and process the data exchanged within the framework of this application.

Each application is identified by a specific value of an application indicator called the "Protocol Service Multiplexer" (or PSM) by the person skilled in the art. This indicator allows in particular the L2CAP layer of each unit 1, 100, 200 to allocate the data contained in each L2CAP data packet received by this unit to the application program residing in the said unit which corresponds to the application to which the data pertain.

Two structures are possible for each communication unit. In one of these structures, commonly designated as "embedded," the operations of all the protocols cited previously as well as those of the application programs are executed in a single processor of the unit. The units 100 and 200 of FIG. 1 possess this structure.

Figure 2:
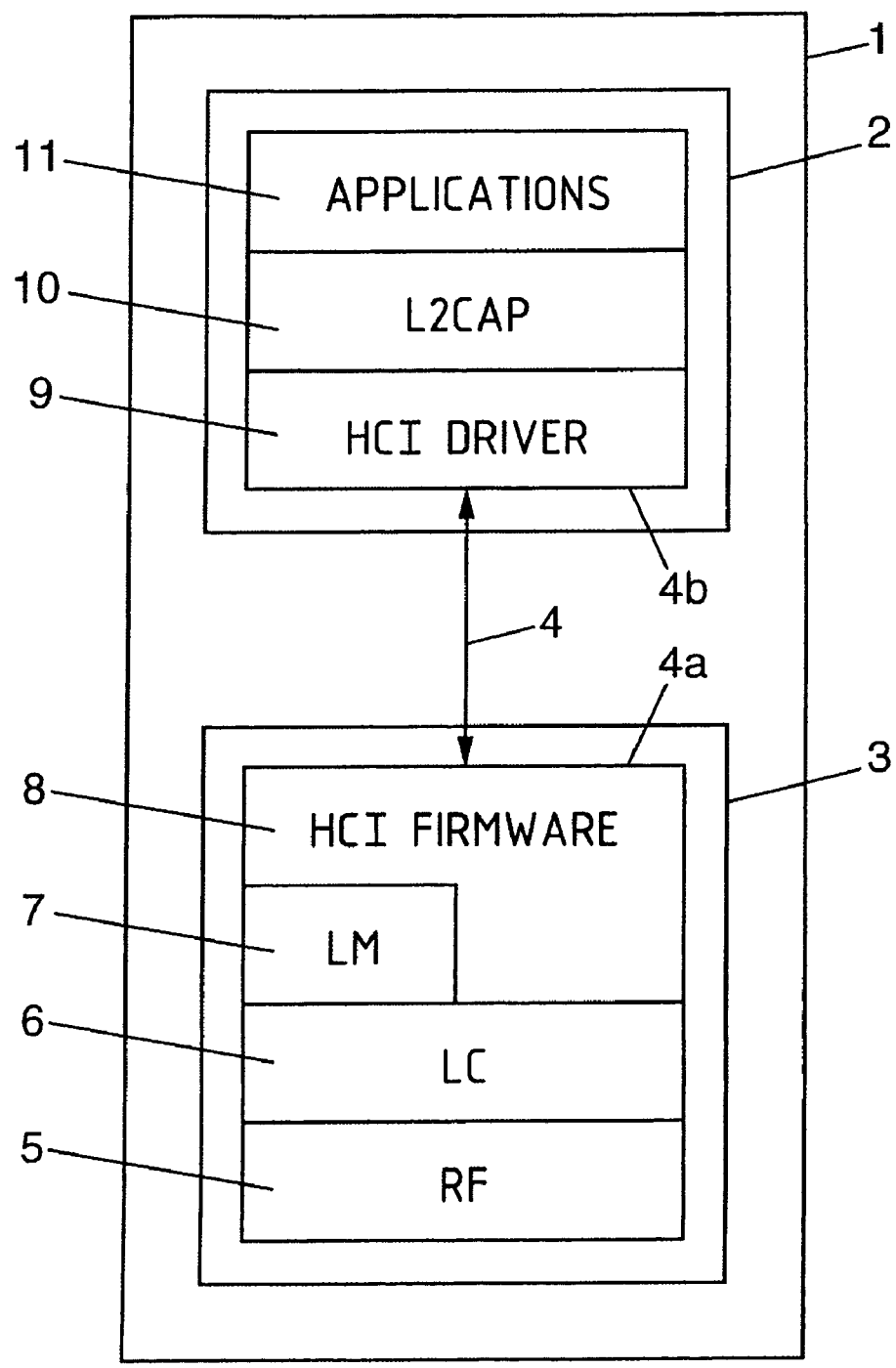
FIG. 2 illustrates the structure of protocols of a master unit to which the invention is applied.

For the implementation of the invention, the master unit 1 possesses a different structure, with two processors, which is detailed in FIG. 2. A first processor 2, called the host, entertains at least one program of an application 11 supported by the unit 1, as well as the L2CAP protocol 10. A second processor 3, the so-called control processor, hosts the so-called lower level layers corresponding to the operations relating to radio transmission, namely the layers 5, 6 and 7 respectively of the RF, LC and LM protocols.

In this two-processor structure, the processors 2 and 3 are interconnected so as to exchange data through a connection 4 internal to the unit 1. This connection 4 may be of various types, such as, for example, a USB ("Universal Serial Bus") connection or a UART ("Universal Asynchronous Receiver Transceiver") connection. It corresponds to the data exchange interfaces 4b and 4a of the processors 2 and 3 respectively. Two layers 8 and 9 of an additional protocol, which may be the "host controller interface" (or HCI) protocol, known to the person skilled in the art, cater within each processor 2, 3 for the shaping and the rebuilding of the data exchanged by their respective interfaces 4b and 4a. The layer 8 carried by the control processor 3 is called the "HCI firmware" and the layer 9 carried by the host processor 2 is called the "HCI driver". The data exchanged by the internal connection 4 are distributed in specific data packets, called HCI packets.

The exchange of data between distinct units of the "piconet" is carried out in the form of data packets transmitted by radio, using the 2400-2483.5 megahertz frequency band, for example. With regard to the Bluetooth standard, we restrict ourselves in what follows to an asynchronous mode of communication ("Asynchronous Connection-Less link" or ACL) between the various units of the "piconet." This mode is especially adapted to the transmission of data, which may possibly be audio or video data, as opposed to transmission of speech.

In the operation of the relevant "piconet," all the data packets sent by any unit of the network are intended for another specified unit of the network. This manner of operation is dubbed "point to point." For this purpose, addressing elements are associated with each data packet transmitted which make it possible to determine the unique recipient unit for the data of this packet.

According to the star communication structure within a "piconet," with a role of router of the data for the master unit at the center of the star, data packets sent by a slave unit are systematically addressed first to the master unit. The application program residing in the master unit then has to determine whether these data are intended for it or whether they are intended for the application program residing in one of the other slave units.

It is assumed that an ACL link is set up between the master unit 1 and the slave unit 100 on the one hand, and between the master unit 1 and the slave unit 200 on the other hand. The three units are consequently in a state awaiting reception of data, commonly dubbed the "open" state by the person skilled in the art. From this state, the slave unit 100 can send data to either the master unit 1, or the slave unit 200. In both cases, these data are transmitted in the form of packets received firstly by the control processor 3 of the master unit 1 which has to transmit the content thereof either to the host processor 2 via the internal connection 4, or to the slave unit 200 via a second radio sending.

Figure 3:
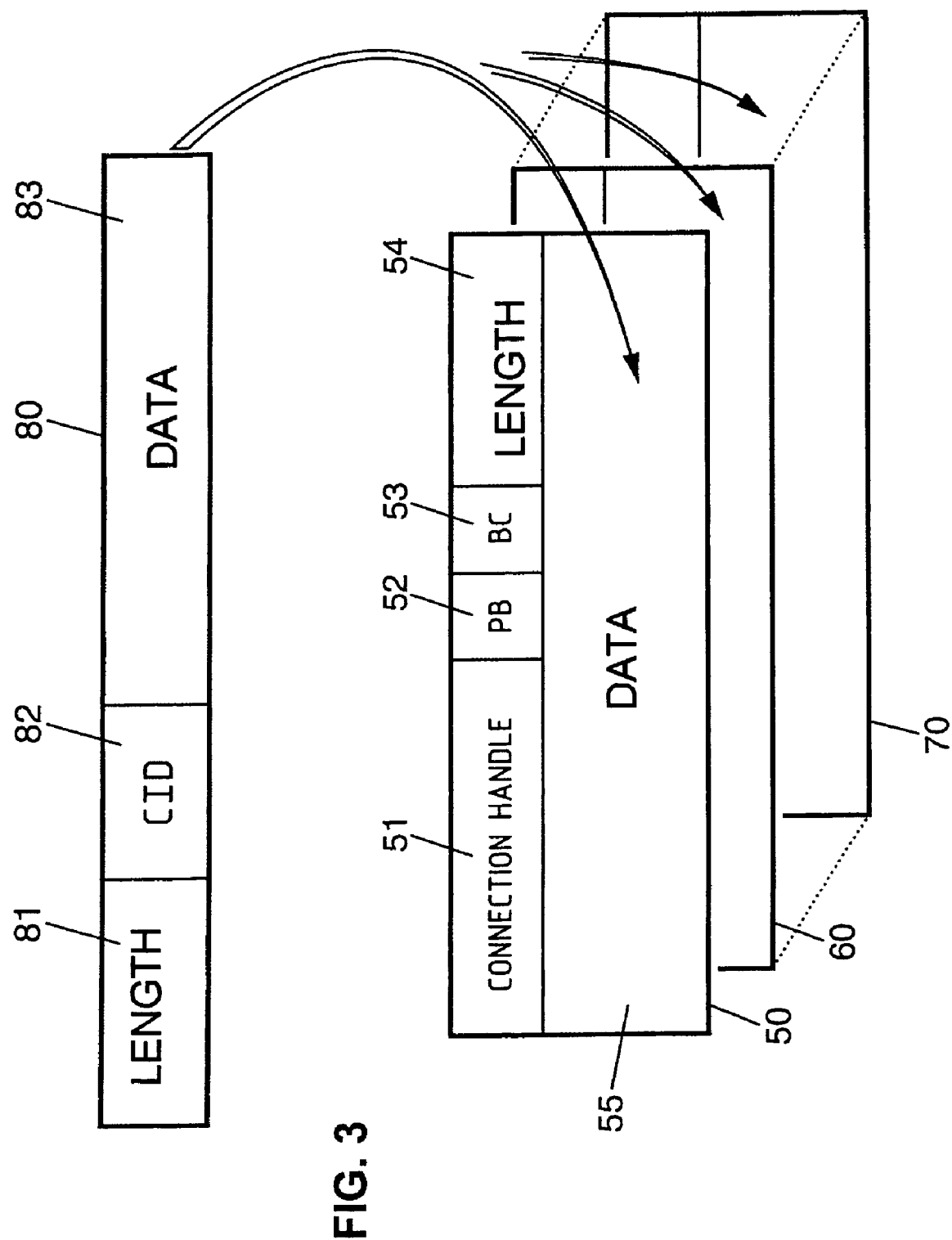
FIG. 3 represents a structure of data packets exchanged between the two processors of the master unit of FIG. 2.

FIG. 3 represents a structure of a data packet 80 sent by the slave unit 100 at the level of the L2CAP protocol layer 110. In a known manner, this data packet 80 can possess the following fields:

- a data field 83 (or "payload"), for example limited to 65533 bytes, and dedicated to data intended to be processed by the application program 11 of the master unit 1 or by that 211 of the slave unit 200;
- a field 81 indicating the length in bytes of the field 83; and
- a field 82 of two bytes containing a logical channel reference ("Channel IDentifier" or CID) allocated by the application program 11 of the master 1 to data packets 80 sent by the slave 100.

Several distinct CIDs may be assigned by the application program 11 identified by the PSM indicator in respect of L2CAP data packets sent by the slave unit 100. In this case, two different CIDs may be used so as to distinguish packets sent by the slave unit 100 containing data intended for the application program 11 of the master unit 1 on the one hand, from packets sent by the slave unit 100 containing data intended for the application program 211 of the slave unit 200 on the other hand. In this case, the determination of the CID of the L2CAP data packets at the level of the control processor 3 makes it possible to direct the data contained by them either to the host processor 2 via the internal connection 4, or for re-sending by radio to the slave unit 200.

The application program 11 identified by the PSM indicator may also assign the same CID to L2CAP packets sent by the slave unit 100 containing data intended for the application program 11 of the master 1 or for the application program 211 of the slave unit 200. In this case, in order to implement the method of the invention, the processor 3 is programmed so as to read from the data field 83 an additional addressing element making it possible to differentiate the master unit 1 from the slave unit 200 as recipient of the data of the L2CAP packet.

In order to be transmitted via the connection 4 between the HCI "firmware" layer 8 hosted by the control processor 3 and the HCI "driver" layer 9 hosted by the host processor 2 within the master unit 1, the L2CAP data packets are chopped into successive segments and encapsulated in HCI packets transmitted one by one. In a manner known to the person skilled in the art, each HCI packet 50, 60, 70 (FIG. 3) comprises the following fields:

- a 12-bit field 51 reserved for a transmission channel indicator at the level of the HCI protocol layer, called the connection handle. The connection handle may be regarded as a tunnel specially dedicated to the transmission of HCI packets between two communication units;
- a data field 55 in which an L2CAP data packet segment 80 is placed;
- a two-byte field 54 for indicating the length of the data expressed in bytes;
- a field 53 of an indicator of mode of broadcast communication ("BroadCast flag" or BC). This field contains the reserved value 00 for point-to-point operation considered in respect of the implementation of the invention; and
- a field 52 of an indicator of continuation of a series of HCI packets ("Packet Boundary" or PB) receiving a value 01 or 10 depending on whether the HCI packet is or is not the first packet of a series of HCI packets transporting successive segments of one and the same L2CAP packet as data.

The data sent by the slave unit 100 are received by the processor 3 in the form of L2CAP packets 80 distributed in a series of successive HCI packets 50, 60, 70, and so on. All the HCI packets of one and the same series, possessing the value 10 in the PB field 52 after a first HCI packet of the series possessing the value 01 in this field, are therefore associated with one and the same logical channel characterized by one and the same value of CID.

The processor 3 determines, at the level of HCI "firmware" layer 8, the direction to be assigned to each HCI packet, as a function of addressing elements associated with this HCI packet. For this purpose, a set of associations between identified addressing elements is stored at the level of the HCI "firmware" layer 8, making it possible to direct the content of each HCI packet either towards the host processor 2 or for re-sending to the slave unit 200.

According to a first mode of implementation of the invention, this direction is determined as a function of the CID of the L2CAP packet contained in a series of HCI packets 50, 60, 70, and so on, successively received. The slave unit 200 and the master unit 1 are then associated with respective CIDs which are distinct with regard to packets sent by the slave unit 100 and containing data intended either for the slave unit 200 or for the master unit 1. The first HCI packet 50 of a series corresponding to a given L2CAP packet is identified according to its PB field 52, and the value of CID characteristic of the L2CAP data packet is read from the field 55 of this first HCI packet 50. This read value of CID is then automatically associated with all the subsequent HCI packets pertaining to the same L2CAP data packet, bearing the value 10 in the respective PB fields 52, until the value 01 is read from the PB field 52 of an HCI packet marking the start of a new series, associated with another L2CAP data packet.

If the read value of CID corresponds to that reserved for data intended for the application program 11 of the master unit 1, the control processor 3 transmits all the successive HCI packets 50, 60, 70, and so on, of the series to the host processor 2 via the internal connection 4. The data of these HCI packets are then processed in a customary manner by the layers 9 and 10, then by the application program 11, if the associated value of PSM corresponds to the application program 11.

If the read value of the CID corresponds to that reserved for the data intended for the application program 211 of the slave unit 200, the control processor 3 replaces, in the field 55 of the first HCI packet 50 of the series, the initial value of CID, corresponding to packets transmitted between the slave unit 100 and the master unit 1 in respect of data intended for the slave unit 200, by the value of CID reserved for data packets originating from the slave unit 100 and retransmitted by the master unit 1 to the slave unit 200. The PSM indicated in the field 55 of the first HCI packet 50 is unchanged. All the HCI packets of the series 50, 60, 70, and so on, are then successively processed by the processor 3 for their sending to the slave unit 200, according to the value of CID associated with the L2CAP packet to which they correspond. In particular, the initial connection handle 51 of each HCI packet is replaced by the connection handle dedicated to the transmission of HCI packets from the master unit 1 to the slave unit 200. Thus, at the HCI level, a data packet re-sent by the master unit 1 to the slave unit 200 possesses an identical structure to that of an HCI packet originating from the slave unit 100, apart from the connection handle 51, and the CID 82 for the first HCI packet of a series corresponding to a given L2CAP data packet. The new value of CID 82 is that allocated to the retransmissions of data originating from the slave unit 100, by the master unit 1 to the slave unit 200. The new connection handle 51 is that allocated to the ACL data transmissions between the master unit 1 and the slave unit 200. The data 83 of the L2CAP packet 80 are thereafter processed by the application program 211 if the associated value of PSM corresponds to the application program 211.

According to a second mode of implementation of the invention, the slave unit 200 and the master unit 1 are associated with logical channels 82 which are identical with regard to packets sent by the slave unit 100 and contain data intended either for the slave unit 200 or for the master unit 1. Consequently, the value of CID read from the first HCI packet 50 of the series relating to one and the same L2CAP data packet no longer makes it possible to determine the communication unit of the recipient "piconet" for the data. The analysis by the processor 3 of the addressing elements associated with the HCI packets 50, 60, 70, and so on, then comprises a reading of at least one additional addressing element from certain at least of the HCI packets so as to determine the recipient communication unit. This addressing element read from the data field 55 of the first HCI packet 50 of the series is an indicator of the recipient unit for the data. This indicator may be, for example, a distinctive Bluetooth address assigned to this unit during its manufacture (or BD_ADDR) or a logical address called the "application slave identifier" (APP_ID) assigned by the application program 11.

For this purpose, the readdressing directive must contain an indication of the location, in the data field 55, at which the indicator of the recipient unit for the data is to be found. This indication has the form, for example, of a number of bytes (known as the "offset") counting from the first byte of an HCI packet. In order for the processor 3 to be able to re-direct all the HCI packets of one and the same series, the indicator of the recipient unit for the data must feature in the data field 55 of the first HCI packet 50 of the series. The processor 3 thus determines the recipient unit for all the HCI packets of the series according to the first HCI packet 50 of the series, and addresses all the successive HCI packets to it one by one, replacing in each of them the initial connection handle 51 by the connection handle dedicated to a transmission from the master unit 1 to the slave unit 200. It furthermore replaces in the first HCI packet 50 the value of CID 82 characteristic of HCI packets transmitted from the slave unit 100 to the master unit 1 by the value of CID characteristic of HCI packets transmitted from the master unit 1 to the slave unit 200. This systematic returning of the HCI packets 50, 60, 70, and so on, by the processor 3 is halted for the first HCI packet exhibiting the value 01 in the PB field 52.

Figure 4:
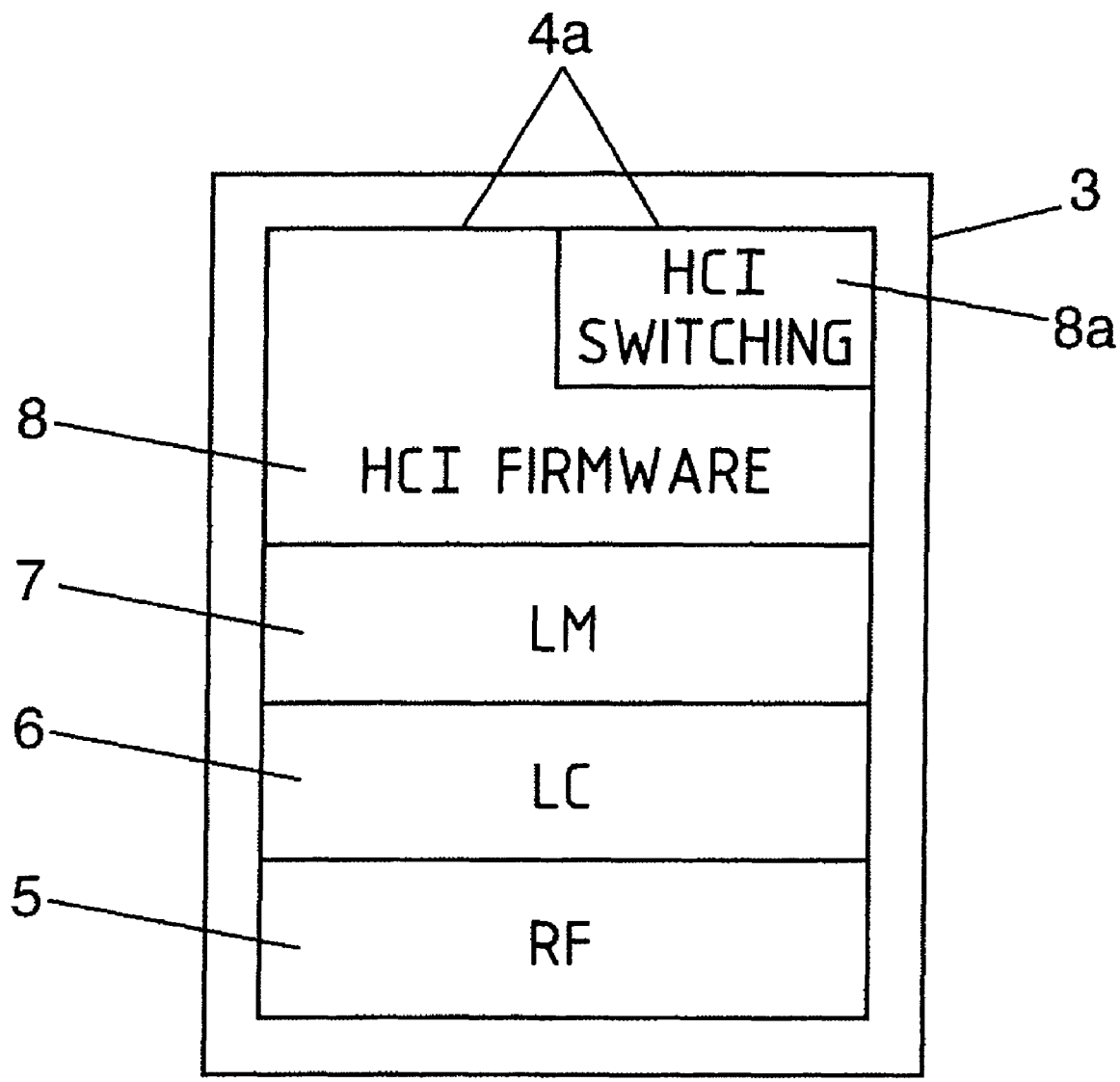
FIG. 4 illustrates the structure of protocols of a control processor according to the invention.

The above-described analysis and possible retransmission of HCI packets may be illustrated diagrammatically by the addition of part of an HCI protocol to the protocol stack hosted by the processor 3 (FIG. 4). Apart from the protocol layers represented in FIG. 2, corresponding to the functions known to the person skilled in the art, the part 8*a*, entitled HCI switching, of the protocol corresponds to the following functions:

formation of the readdressing directive from interassociated addressing elements received by the interface 4*a*;
storage of the readdressing directive;
analysis of the HCI packets produced by the "HCI firmware" layer 8 according to the readdressing directive; and
directing of these HCI packets either towards the interface 4*a* or with a view to a processing corresponding to the LC layer 6.

The readdressing directive comprises a switching table associating final addressing elements with initial addressing elements featuring as input to the table.

The readdressing condition makes it possible to determine whether the addressing elements associated with a given HCI packet correspond to one of the initial addressing elements. In the positive case, the final addressing elements indicated by the switching table are assigned to the HCI packet so that the latter is re-sent to the recipient slave unit for the data carried by this packet.

A first procedure for updating the switching table uses the primitive PING known to the person skilled in the art. This primitive is produced by the application program 11 of the master unit 1 for the L2CAP layer 10 and relates to each slave unit identified, for example, by its Bluetooth address (BD_ADDR). This primitive triggers an interrogation of all the slave units by the master unit 1, at the level of the L2CAP layer. In a manner known per se, this interrogation can proceed, in particular, by the dispatching by radio of a packet of ECHO REQUEST type to each slave unit. Each slave unit then responds to the master unit 1 by a packet of ECHO RESPONSE type comprising the CIDs assigned to the master unit 1 and to this particular slave unit in respect of L2CAP data packets dispatched respectively by the master unit 1 to this slave unit and by this slave unit to the master unit 1. These elements are thereafter retransmitted to the application program 11 of the master unit 1 by the primitive PING.

The application program 11 of the master unit 1 then has available all the addressing elements involved during exchanges of data pertaining to the relevant application, namely, the CIDs of the units 100, 200 and of the master unit 1 for each direction of transmission, the BD ADDR and the APP_ID of each slave unit. An HCI command packet specially dedicated during the design of the processors 2 and 3 is thereafter dispatched to the HCI "firmware" layer 8 by the application program 11. This HCI packet can be tagged by a specific value placed, for example, in the OGF ("Opcode Group Field") field of this packet, known to the person skilled in the art. This HCI command packet contains an instruction of association between initial and final addressing elements.

A second procedure for updating the switching table can consist of a tagging by the layer 8 of L2CAP signaling packets of CONNECTION REQUEST and CONNECTION RESPONSE type used when setting up a connection between a slave unit and the master unit. This tagging is concentrated initially on the CONNECTION REQUEST signaling packets containing a value of PSM corresponding to the relevant application. The associated CONNECTION RESPONSE signaling packets then contain the paired CIDs assigned to bilateral exchanges between a given slave unit and the master unit 1 for this application. Layer 8 then addresses these elements to the application program 11 by a specially dedicated HCI packet. In the same manner as in the first updating procedure, an instruction for associating addressing elements, which is necessary for directing the HCI packets 50, 60, 70, and so on, is returned to the processor 3 by the application program 11. Conversely, such an association is eliminated during the tagging by layer 8 of L2CAP packets for closing a connection involved in the association.

An advantage of this second procedure is that it is entirely internal to the master unit 1, as opposed to the first procedure which requires a specific exchange of data packets between the master unit 1 and the slave units.

The "HCI firmware" layer 8 therefore has available associations between addressing elements for each application program 11 residing in the host processor 2, identified by the PSM of the application. The readdressing directive formulated from these associations comprises the switching table and the readdressing condition. These elements of the readdressing directive allow the formulation, at the level of layer 8, of a program for directing the HCI packets. Instruction lines of this program are given hereinbelow by way of example, with reference to FIGS. 3 and 4, in respect of the processing of an HCI ACL data packet originating from the slave 100, in the case where distinct CIDs are used for data intended for the slave unit 200 or for the master unit 1:

```
If PB = 01, then
    read the Local_CID from the data field
    if Local_CID ∈ list of switched CIDs, then
        read Recipient_CID (of the slave unit 200) from
the switching table
        read the BD_ADDR of the final recipient unit (of
the slave unit 200)
            search for the "connection handle (BD_ADDR)"
            construct a new HCI ACL data packet
            field 51 ← "connection handle (BD_ADDR)"
            field 52 ← "01"
            fields 53 and 54: identical to those of the HCI
packet received
            field 55 containing the start of an L2CAP packet
80:
            field 81 identical to that contained in the HCI
packet received
                field 82 ← Recipient_CID
                field 83 identical to that contained in the HCI
packet received
            send the new HCI ACL data packet
            indicator of series of HCI packets in progress ←
TRUE
        Else
            send the HCI ACL data packet received by the
interface 4a
            indicator of series of HCI packets in progress ←
FALSE
        End If
    Else (PB = 10)
        If indicator of series of HCI packets in progress =
TRUE
            construct a new HCI ACL data packet
            field 51 ← "connection handle (BD_ADDR)" (the
same as for the last HCI packet in which PB = 01)
            fields 52-55 identical to those of the packet
received
            transmit the HCI ACL data packet received to the
LC layer 6
        Else
            send the HCI ACL data packet received by the
interface 4a
        End If
    End If.
```

The invention claimed is:

1. A master unit for managing a star topology networking connection with a plurality of slave units, comprising:

a first processor configured to execute a master unit application that allocates a first and second logical channel identifier data to slave unit communications, the first logical channel identifier data assigned for inclusion in a field of a data packet communication to indicate that the communication is a slave-to-master data packet communication and the second logical channel identifier data assigned for inclusion in a field of the data packet communication to indicate that the communication is a slave-to-slave data packet communication;

a second processor configured to manage master unit communications with the slave units over the star topology networking connection; and a communications link within the master unit between the first and second processors; and the second processor including a switching functionality which processes a data packet communication received from one of the slave units, determines whether the field contains the first or second logical channel identifier data, and the second processor configured to:

send the data packet communication to the first processor over the communications link for handling in accordance with the application if the field contains the first logical channel identifier data, and reroute, without sending to the first processor over the communications link, the data packet communication for transmission from the master unit to one of the slave units if the field contains the second logical channel identifier data.

2. The master unit of claim 1 wherein rerouting of the data communications is accomplished by the second processor by replacing the second logical channel identifier data in the field with a third logical channel identifier data assigned to indicate that the communication is a slave-to-slave data communication which has been retransmitted by the master unit to the second slave unit.

3. The master unit of claim 1, wherein the star topology networking connection is a Bluetooth piconet and the first and second logical channel identifier data comprises channel identifiers (CIDs).

4. The master unit of claim 1, the first processor further supporting an L2CAP protocol layer, wherein the first and second logical channel identifier data comprises logical channel identifiers of L2CAP data packets.

5. A method for master unit management of a star topology networking connection with a plurality of slave units, the master unit including a first processor configured to execute a master unit application, a second processor configured to manage master unit communications with the slave units over the star topology networking connection, and a communications link within the master unit between the first and second processors, the method comprising:

executing the master unit application to allocate first and second logical channel identifier data, wherein the first logical channel identifier data is assigned to indicate that a communication is a slave unit to master unit data packet communication and the second logical channel identifier data is assigned to indicate that the communication is a slave unit to slave unit data packet communication;

communicating the first and second logical channel identifier data from the first processor to the second processor over the communications link;

processing a data packet communication received from one of the slave units in the second processor to determine whether a field in the data packet communication contains the first or second logical channel identifier data;

sending by the second processor the data communication over the communications link to the first processor for handling in accordance with the application if the field contains the first logical channel identifier data; and rerouting by the second processor without sending to the first processor the data communication for transmission from the master unit to one of the slave units if the field contains the second logical channel identifier data.

6. The method of claim 5 wherein rerouting of the data communications is accomplished by the second processor by replacing the second logical channel identifier data in the field with a third logical channel identifier data assigned to indicate that the communication is a slave-to-slave data communication which has been retransmitted by the master unit to the one of the slave units.

7. The method of claim 5, wherein the star topology networking connection is a Bluetooth piconet and the first and second logical channel identifier data comprises channel identifiers (CIDs).

8. The method of claim 5, the first processor further supporting an L2CAP protocol layer, wherein the first and second logical channel identifier data comprises logical channel identifiers of L2CAP data packets.

* * * * *